E. P. HENDERSON.
RESILIENT TIRE.
APPLICATION FILED DEC. 23, 1921.
1,434,118. Patented Oct. 31, 1922.
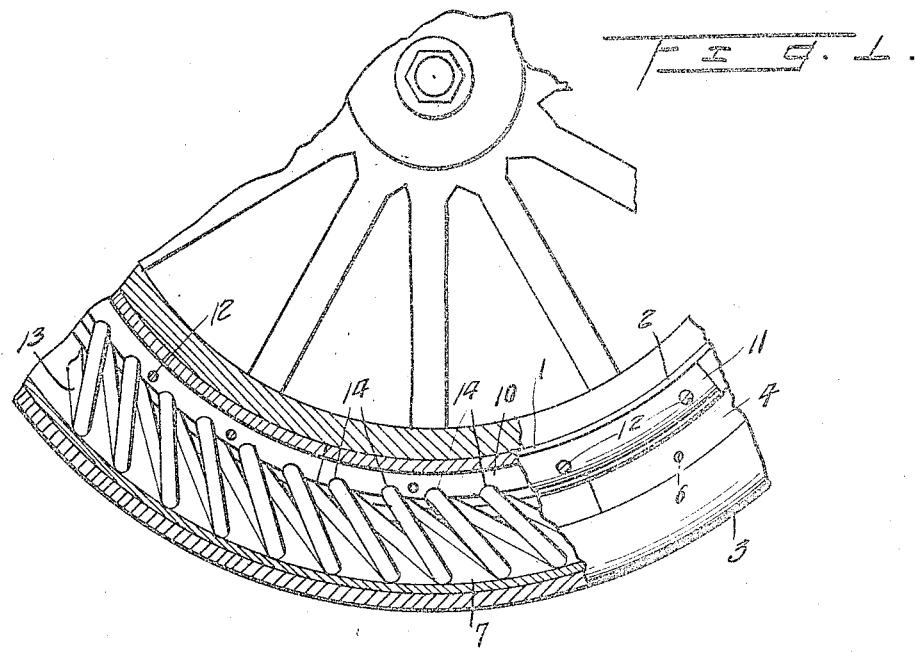
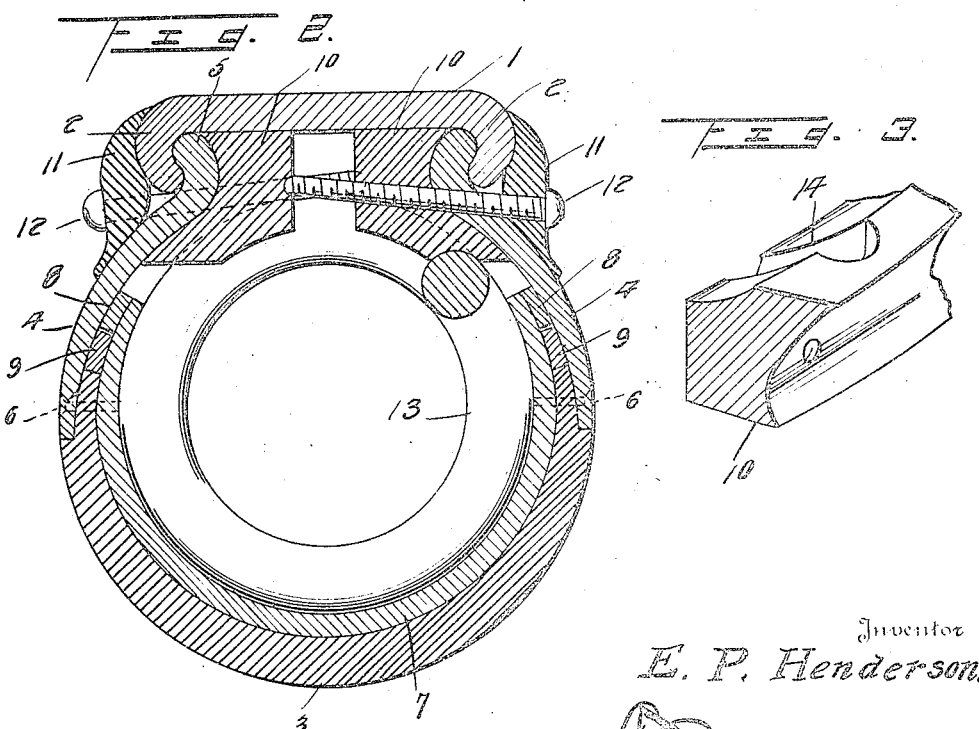
Inventor
E. P. Henderson.
Attorney Patented Oct. 31, 1922.

1,434,118

UNITED STATES PATENT OFFICE.

EDWARD P. HENDERSON, OF DAYTONA, FLORIDA.

RESILIENT TIRE.

Application filed December 23, 1921. Serial No. 524,384.

*To all whom it may concern:*

Be it known that I, EDWARD P. HENDERSON, a citizen of the United States, residing at Daytona, in the county of Volusia and State of Florida, have invented certain new and useful Improvements in Resilient Tires; and I do hereby declare the following to be a full, clear, and exact description of the invention, such as will enable others skilled in the art to which it appertains to make and use the same.

The invention relates to tires designed more particularly for automobiles and analogous motor vehicles and has for its object the provision of a tire which possesses practically all the qualities of a pneumatic tire but which is proof against puncture, blowout and rim cut, and which does not depend upon inflation to maintain the tire in operative condition for neutralizing shock and vibration.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of a portion of a vehicle wheel equipped with a tire embodying the invention, parts of the tire being broken away, Figure 2 is a transverse section of the tire and supporting rim, showing the parts on a larger scale, and Figure 3 is a fragmental perspective view of one of the inner clamp members of the casing.

Corresponding and like parts are referred to in the following description and designated in the several views of the drawings by like reference characters.

The numeral 1 designates the rim of the wheel and the same may be fixed or demountable depending upon the particular construction of the wheel. The rim 1 is of the channel type and is provided at opposite sides with outwardly extending flanges 2 which are inwardly curved to insure interlocking engagement with the reinforced edges of the casing.

The casing comprises a tread portion 3 and side members 4, the inner edge portions 5 of which are outwardly curved to make interlocking engagement with the flanges 2 of the rim 1. The tread portion 3 of the casing may consist of rubber or other suitable material and the side portions 4 are preferably of metal, the opposing edge portions of the parts 3 and 4 overlapping and being secured by suitable fastenings 6, such as machine screws or bolts. The edge portions of the side members 4, secured to the tread portion 3, are let into the latter so as to come flush therewith on the outer side to present a smooth unobstructed surface. The side members 4 may each be a ring having a split, or the members may consist of a plurality of sections.

An inner shoe 7 is placed against the inner side of the tread portion 3 and preferably consists of metal and is retained in place by the same fastening means 6 employed to connect the parts 3 and 4. The edge portions of the shoe 7 project slightly beyond the edges of the tread portion 3. A metal ring 8 is secured to the outer side of each projecting edge portion of the shoe 7 and is adapted to engage a companion ring 9 secured to the inner side of the member 4 adjacent the inner edge of the part 3. Any tendency of the shoe 7 to turn relative to the casing 3 is obviated by the coaction of the rings 8 and 9 which are in alignment and in substantially abutting relation.

The casing is positively secured to the rim 1 by means of inner clamp members 10 and outer clamp members 11, bolts or screws 12 serving to connect the clamp members and passing through openings formed in the edge portions of the members 4. The inner edge portions 5 of the casing are clamped between the members 10 and the rim flanges 2. The outer clamp members 11 engage the outer side of the rim flanges 2 and the members 4 and their edge portions taper and curve in opposite directions to obtain a neat and close fit against the parts 2 and 4, the intermediate portions being heavy to sustain the strain of the draw or clamp bolts 12. The members 10 are preferably formed in sections to enable the device to be more readily assembled and the members 11 may consist of one piece or the same may consist of a plurality of sections.

A coil spring 13 constructed of spring wire of proper gage is disposed within the casing and holds the same expanded and sustains the load and yields whereby to absorb shock and vibration. The inner sides of the clamp members 10 are curved and formed with transverse grooves 14 which constitute seats to receive the coils or volutes of the spring 13 whereby to prevent circumferential movement of the spring and to maintain the coils thereof in predetermined spaced relation. The coils or volutes of the spring are relatively inclined to radii of the wheel, as indicated most clearly in Figure 1, with the result that the spring is well adapted to yield under load stresses without becoming crushed or distorted, the coils or volutes quickly assuming their normal shape and position when relieved of the load and stresses incident thereto.

The outer surface of the tread portion 3 of the casing may be finished in any manner, that is, it may be plain or roughened in any way to resist tendency to skid and increase the tractive force. The tread portion 3 may be of any material and if omitted the side members 4 may be attached directly to the edge portions of the shoe 7.

What is claimed is:

1. In a vehicle tire, a casing, and inner and outer clamp members confining edge portions of the casing and adapted to confine the flanges of a rim.

2. In a vehicle tire, a casing and inner and outer clamp members confining edge portions of the casing and the flanges of a rim, the outer clamp members having opposite edge portions tapered and reversely curved to obtain a neat and close fit relative to the casing and flanges of the rim.

3. A resilient tire comprising a casing including a flexible tread portion and side portions of rigid material, projections extending inwardly from the side portions of the casing, an inner shoe, and outer projections at the edges of the inner shoe adapted to cooperate with the inner projections of the casing to prevent outward displacement of said inner shoe.

4. A resilient tire comprising a casing, inner and outer clamp members in cooperative relation with edge portions of the casing, the inner clamp members having transverse grooves, and a wire coil within the casing and having its volutes seated in the grooves of the inner clamp members.

5. In a tire of the character specified, a casing comprising a flexible tread portion and rigid side members, rings secured to the inner sides of said side members, a shoe within the casing, and rings attached to the outer side of the edge portions of the shoe and adapted to engage and cooperate with the rings attached to the side members of the casing whereby to prevent displacement of the shoe.

6. In a tire of the character specified a casing having rigid edge portions adapted to interlockingly engage the flanges of a rim, inner and outer clamp members, clamp screws connecting the clamp members, and a wire coil within the casing.

7. In a tire of the character specified, a casing having rigid edge portions adapted to interlockingly engage the flanges of a rim, inner and outer clamp members, clamp screws connecting the clamp members, a wire coil within the casing, the inner clamp members having transverse grooves to receive the convolutes of the wire coil, a shoe disposed between the wire coil and the tread portion of the casing, and overlapping members between the edge portions of the shoe and side portions of the casing to prevent displacement of the shoe.

8. In a tire of the class described, a casing having a rigid edge portion, inner and outer clamps one to either side of said rigid edge portion, the inner clamp being in engagement with the inner face of the rigid edge portion, the outer clamp being spaced from the rigid edge portion, and clamp screws for clamping the outer clamp member to the flange of a rim.

9. In a tire of the class described, a casing having a rigid edge portion, inner and outer clamps, one to either side of said rigid edge portion, the inner clamp being in engagement with the inner face of the rigid edge portion and the outer clamp being spaced therefrom, clamp screws for clamping the outer clamp member to the flange of a rim, a coil within the casing, and the inner clamp having transverse grooves forming seats for the convolutes of the coil.

In testimony whereof I affix my signature in presence of two witnesses.

EDWARD P. HENDERSON.

Witnesses:
 CHRISTIAN L. HORN,
 ROSCOE V. BURK.